(12) United States Patent  
Hattori et al.

(10) Patent No.: US 6,213,827 B1  
(45) Date of Patent: Apr. 10, 2001

(54) WATERCRAFT ENGINE EXHAUST SYSTEM

(75) Inventors: Toshiyuki Hattori; Masayoshi Nanami, both of Iwata (JP)

(73) Assignee: Yamaha Hatsudoki Kabushiki Kaisha, Iwata (JP)

( * ) Notice: Subject to any disclaimer, the term of this patent is extended or adjusted under 35 U.S.C. 154(b) by 0 days.

(21) Appl. No.: 09/260,319

(22) Filed: Mar. 1, 1999

(30) Foreign Application Priority Data

Feb. 27, 1998 (JP) .................................................. 10-46566

(51) Int. Cl.$^7$ .................................................. B63H 21/32
(52) U.S. Cl. ........................... 440/89; 440/38; 114/55.5; 60/312; 60/321
(58) Field of Search .................... 440/38, 88, 89; 114/55.5, 55.53, 55.55, 55.56, 55.57; 60/298, 299, 302, 312, 314, 317, 321

(56) References Cited

U.S. PATENT DOCUMENTS

| | | | |
|---|---|---|---|
| 3,771,315 | * 11/1973 | Scott | 60/297 |
| 3,807,527 | * 4/1974 | Bergson et al. | 181/35 B |
| 4,019,456 | * 4/1977 | Harbert | 115/73 |
| 4,609,068 | 9/1986 | Backlund . | |
| 4,643,272 | 2/1987 | Gaffrig . | |
| 4,781,021 | 11/1988 | Winberg . | |
| 4,811,560 | * 3/1989 | Nakase et al. | 60/310 |
| 5,022,877 | 6/1991 | Harbert . | |
| 5,147,232 | * 9/1992 | Miles, Jr. et al. | 440/89 |
| 5,234,364 | * 8/1993 | Ito | 440/89 |
| 5,324,217 | 6/1994 | Mineo . | |
| 5,366,401 | 11/1994 | Nanami et al. . | |
| 5,556,314 | 9/1996 | Fukuda et al. . | |
| 5,558,549 | * 9/1996 | Nakase et al. | 440/88 |
| 5,572,943 | * 11/1996 | Kobayashi et al. | 114/270 |
| 5,699,749 | * 12/1997 | Yamada et al. | 114/270 |
| 5,702,276 | * 12/1997 | Nakase et al. | 440/89 |
| 5,746,630 | 5/1998 | Ford et al. . | |
| 5,788,547 | * 8/1998 | Ozawa et al. | 440/89 |
| 5,882,236 | * 3/1999 | Ozawa et al. | 440/89 |
| 5,885,121 | * 3/1999 | Nanami et al. | 440/88 |
| 5,911,609 | * 6/1999 | Fujimoto et al. | 440/89 |
| 5,931,712 | * 8/1999 | Hattori et al. | 440/89 |
| 6,010,378 | * 1/2000 | Fujimoto et al. | 440/89 |
| 6,017,255 | * 1/2000 | Nanami | 440/89 |
| 6,030,263 | 2/2000 | Uchino et al. . | |

FOREIGN PATENT DOCUMENTS

| 1305292 | * 1/1973 | (GB) | 440/89 |
|---|---|---|---|
| 18196 | * 1/1990 | (JP) | 440/89 |

* cited by examiner

*Primary Examiner*—S. Joseph Morano  
*Assistant Examiner*—Ajay Vasudeva  
(74) *Attorney, Agent, or Firm*—Ernest A. Beutler

(57) ABSTRACT

Several embodiments of personal watercraft employing exhaust systems that incorporate not only a catalyst, but also an exhaust silencing device for silencing the sounds of the exhaust gases. The components are laid out in such a way that there will be minimum heat transfer from the exhaust gases to the engine compartment, and also so that there will be a cooling air flow across the exhaust system to further provide this result. In one embodiment, the silencing device is mounted transversely at the front of the engine, and in other embodiments it is disposed longitudinally to the rear of the engine. In all embodiments, the components are laid out to maintain good fore and aft and side to side balance.

19 Claims, 12 Drawing Sheets

WATERCRAFT ENGINE EXHAUST SYSTEM

BACKGROUND OF THE INVENTION

This invention relates to a watercraft and more particularly to a personal watercraft and an engine exhaust system for such watercraft.

Personal watercraft have enjoyed a substantial amount of success and are quite popular. This type of watercraft is generally recognized as a relatively small watercraft that is designed primarily for operation by a rider who may carry with him no more than two or three additional passengers. This type of watercraft is, as well known, quite sporting in nature.

Because of their small size and high degree of maneuverability, however, there are certain objections to the use of these watercraft on some bodies of water. One of these objections is caused by the fact that this type of watercraft, primarily because of its small size, has a relatively simple exhaust system that does not provide a significant degree of silencing.

This result is mandated primarily by the very compact nature of the watercraft and the relatively small area that is available for exhaust treatment. Because these watercrafts can be utilized on quite small bodies of water, the potential noise may be more objectionable than larger watercraft having unmuffled exhaust systems but which do not operate on these small bodies of water.

This, therefore, a principal object of this invention to provide an improved exhaust system and particularly an exhaust silencing system for personal watercraft.

It is a further object of this invention to provide an improved and compact, yet highly effective silencing system for the exhaust of a personal watercraft.

Generally, personal watercraft may employ one or more expansion chambers which can provide some at relatively limited silencing effect. That is, the conventional exhaust system employed with a personal watercraft does not use a silencing system that embodies a muffler of the type utilized with other engine applications.

The types of mufflers employed in these other applications depend upon the type and acoustical range of silencing to be effected, but they can use a variety of devices such as a plurality of separate expansion chambers interconnected by small interconnecting passages, silencing devices such as Helmholtz resonators or perforated tubes surrounded by an expansion chamber.

It is, therefore, a further object of this invention to provide an improved exhaust system for a personal watercraft that can employ a muffler or silencing device of the noted types.

One difficulty with the incorporation of a muffler or similar silencing device in a personal watercraft, in addition to the space, is the heat that may be generated by such devices. It is, therefore, another object of this invention to provide an improved cooling arrangement for the muffler or silencer of a personal watercraft exhaust system.

The components of the exhaust system also may be relatively bulky in size and can become heavy, particularly if multiple chambers and multiple shells are employed. Because of the small nature of a personal watercraft, therefore, the placement of these components becomes critical so as to maintain the proper balance for the watercraft, particularly when a number of passengers or the seating location of a single rider may vary.

It is, therefore, a still further object of this invention to provide an improved component layout for the exhaust system of a personal watercraft.

In addition to employing expansion chambers and silencing devices, it may also be desirable to provide a catalyst in the exhaust systems for treatment of exhaust gases so as to prevent the emission of unwanted exhaust gas constituents to the atmosphere or to the body of water in which the watercraft is operating. This further complicates the positioning and location of the exhaust system components. This is particularly true if cooling arrangements are employed for the muffler inasmuch as the catalyst should be operated at a relatively high temperature in order to become effective. Thus, the catalyst should not be overcooled.

It is, therefore, a still further object of this invention to provide an improved catalytic and silenced exhaust system for a personal watercraft.

In addition to the aforenoted features, it is also desirable to employ certain sensors in the exhaust system. The placement of the sensors also is important. Furthermore, the sensors should be positioned so that they can be conveniently accessed for servicing.

It is, therefore, yet another object of this invention to provide an improved exhaust system and sensor arrangement for a personal watercraft wherein the sensor components can be conveniently accessed.

SUMMARY OF THE INVENTION

This invention is adapted to be embodied in a personal watercraft having a hull that defines a rider's area that is sized to accommodate a rider operator and no more than a few additional passengers. The hull defines a engine compartment in which a powering internal combustion engine is provided. The engine is mounted in the hull and drives a propulsion device for propelling the watercraft through a transmission. The engine is provided with an exhaust system including at least one exhaust port for discharging exhaust gases from a combustion chamber of the engine. The exhaust system collects the exhaust gases from the exhaust port and discharges them to the atmosphere. The exhaust system incorporates at least one silencer having an acoustical silencing device for silencing the exhaust gases.

In accordance with one feature of the invention, the exhaust silencer is provided with a cooling jacket through which cooling water is circulated and this cooling water is discharged to the body of water in which the watercraft is operating through the exhaust system.

In accordance with another feature of the invention, the exhaust system is also provided with a pair of sensors that sense different exhaust conditions. The engine compartment is provided with an access opening that is normally closed by a removable closure. These sensors are accessible through this access opening.

In accordance with another feature of the invention, the exhaust system also includes a water lock device that is disposed downstream of the exhaust silencer. The exhaust silencer and water lock device are interrelated so as to provide balance to the hull by positioning them on opposite sides of a plane that extends in either one of a transverse or longitudinal direction of the watercraft.

In accordance with another feature of the invention, the engine compartment of the watercraft is provided with a ventilating system and the engine has an air inlet system. The exhaust silencing device is interrelated with these air systems for positioning it so that cooling air flows across the exhaust silencing device.

DETAILED DESCRIPTION OF THE PREFERRED EMBODIMENTS OF THE INVENTION

Figure 1:
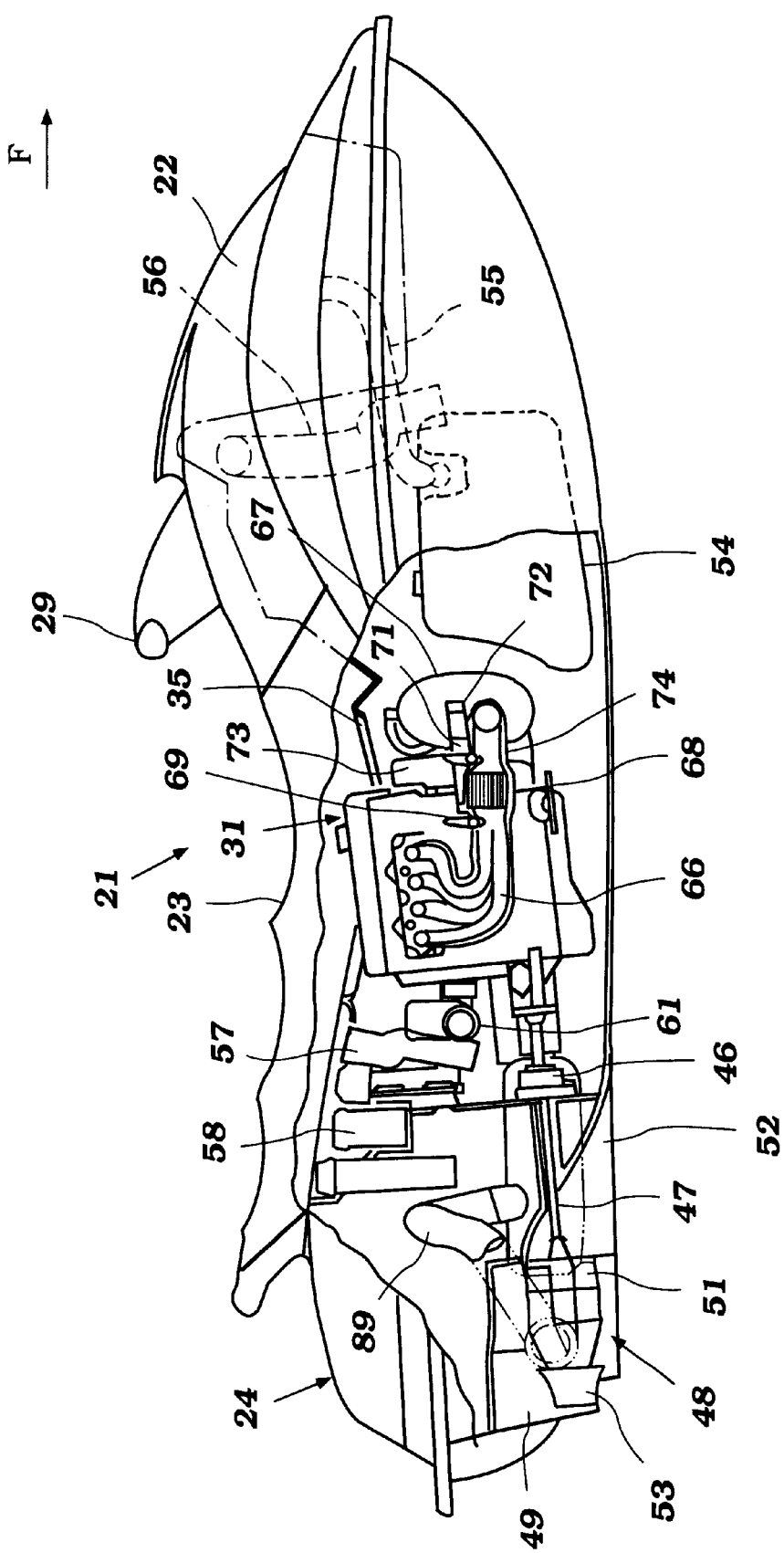
FIG. 1 is a side elevational view of a personal watercraft constructed in accordance with a first embodiment of the invention, with a portion broken away so as to show the internal components thereof.
Figure 2:
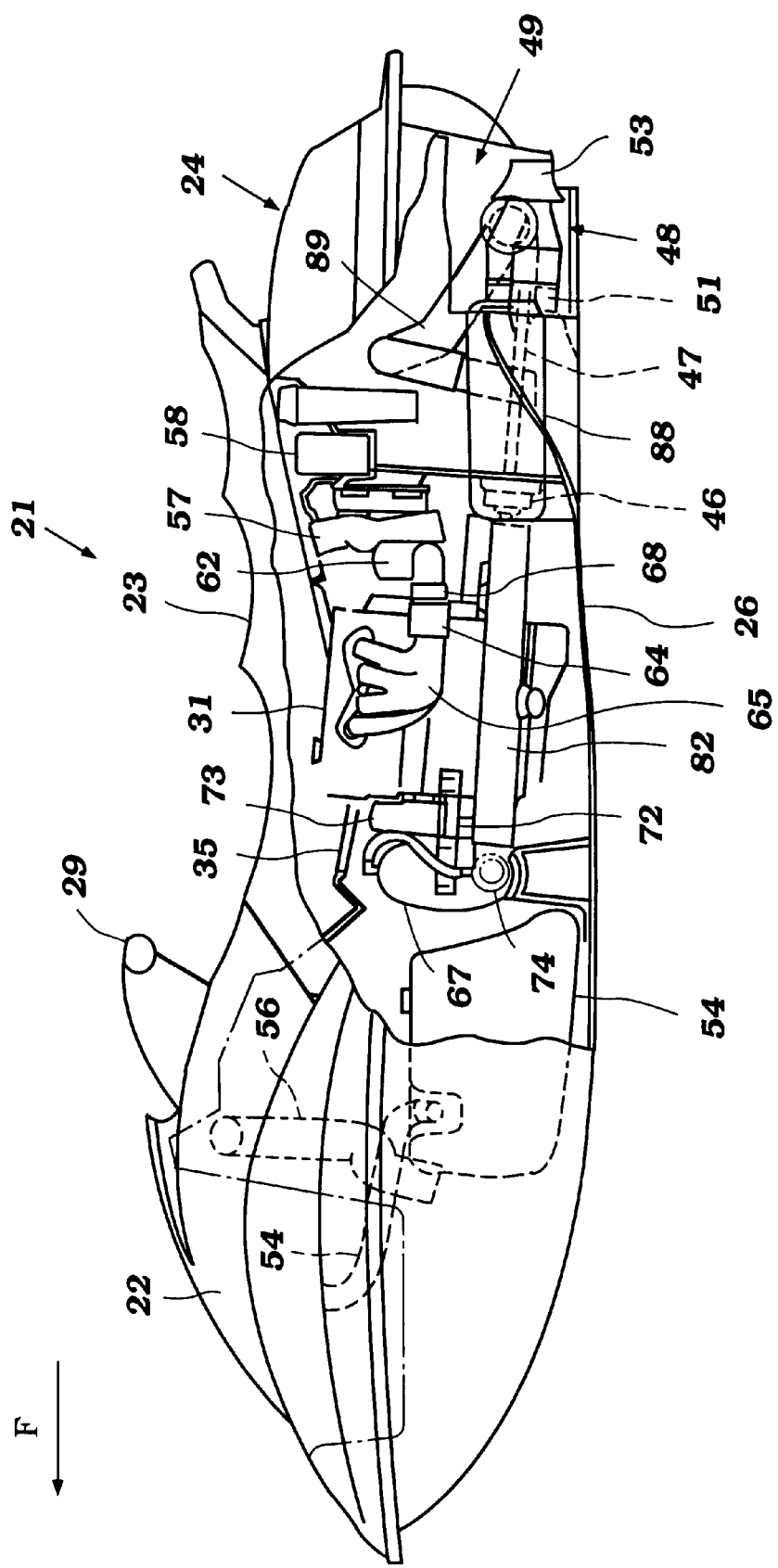
FIG. 2 is a side elevational view of the watercraft shown in FIG. 1 but looking in the opposite direction and also with another portion broken away.
Figure 3:
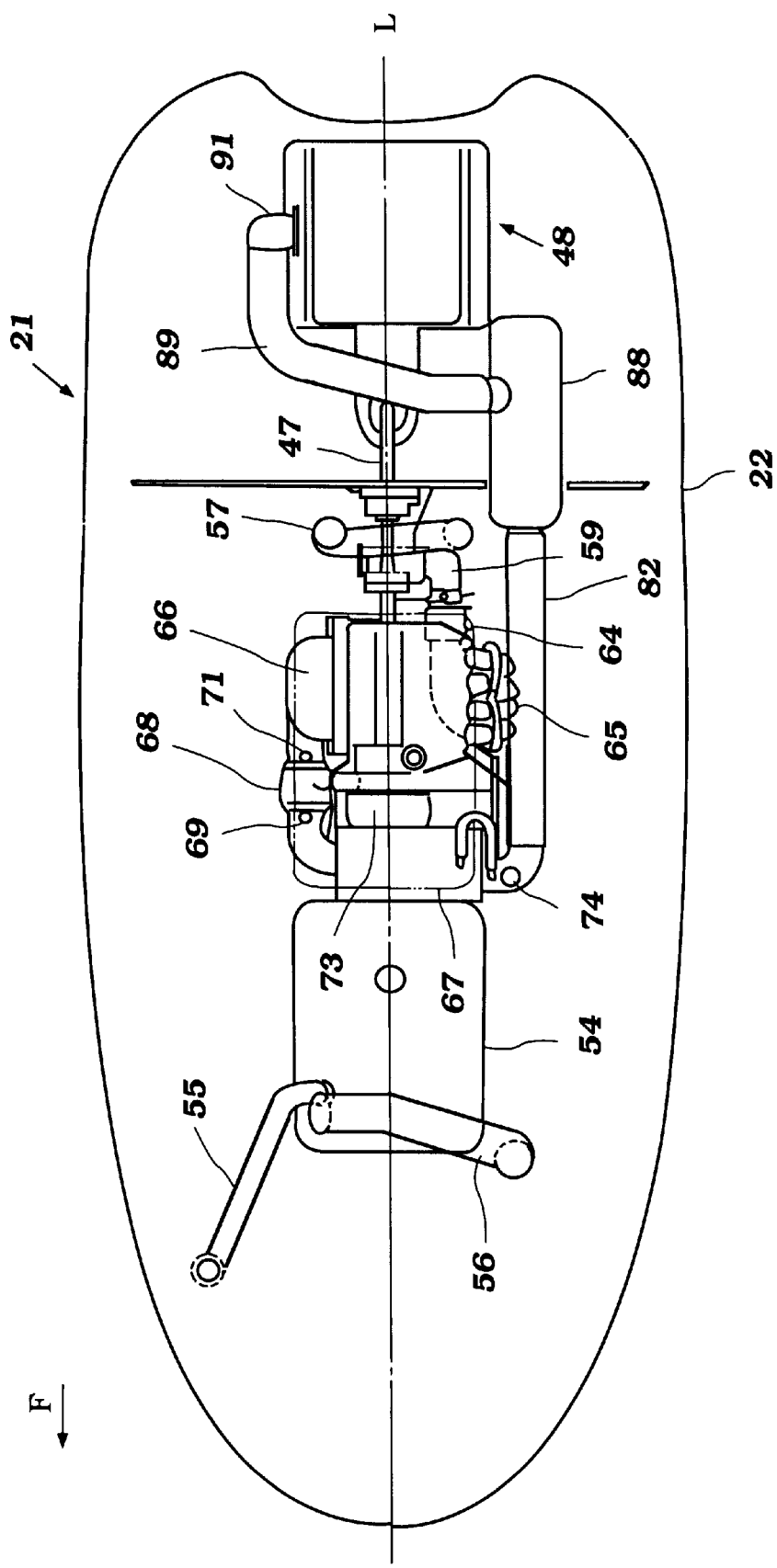
FIG. 3 is a top plan view of the watercraft with the hull being shown in phantom so as to reveal the internal components in solid lines.

Referring now in detail to the drawings and initially to the embodiment of FIGS. 1–6, a small personal watercraft constructed in accordance with a first embodiment of the invention is indicated generally by the reference numeral 21. The watercraft 21, in accordance with the aforenoted definition of personal watercraft, is comprised primarily of a hull assembly, indicated generally by the reference numeral 22, which forms a rider's area at the rearward portion thereof which is defined primarily by a straddle type seat 23 that is disposed on a raised portion 24 of the hull 22 and which is bounded on its outer sides by a pair of foot areas 25. Riders are accommodated on the seat 23 in straddle tandem fashion with their feet in the foot areas 25. In the illustrated embodiment, the watercraft 21 and specifically its seat 23 is configured so as to accommodate a maximum of three riders seated in this fashion.

The hull 22 is comprised of a hull under part 26 to which a deck portion 27 is affixed in any known manner. Preferably, the hull portions 26 and 27 are formed from a molded fiberglass reinforced resin or a similar material. The hull portion 26 has a generally V shaped bottom, indicated generally by the reference numeral 28.

A control area including a mast 29 is provided on the deck portion 27 forwardly of the seat 23 so that the forward most seated rider may operate the watercraft 21.

Figure 4:
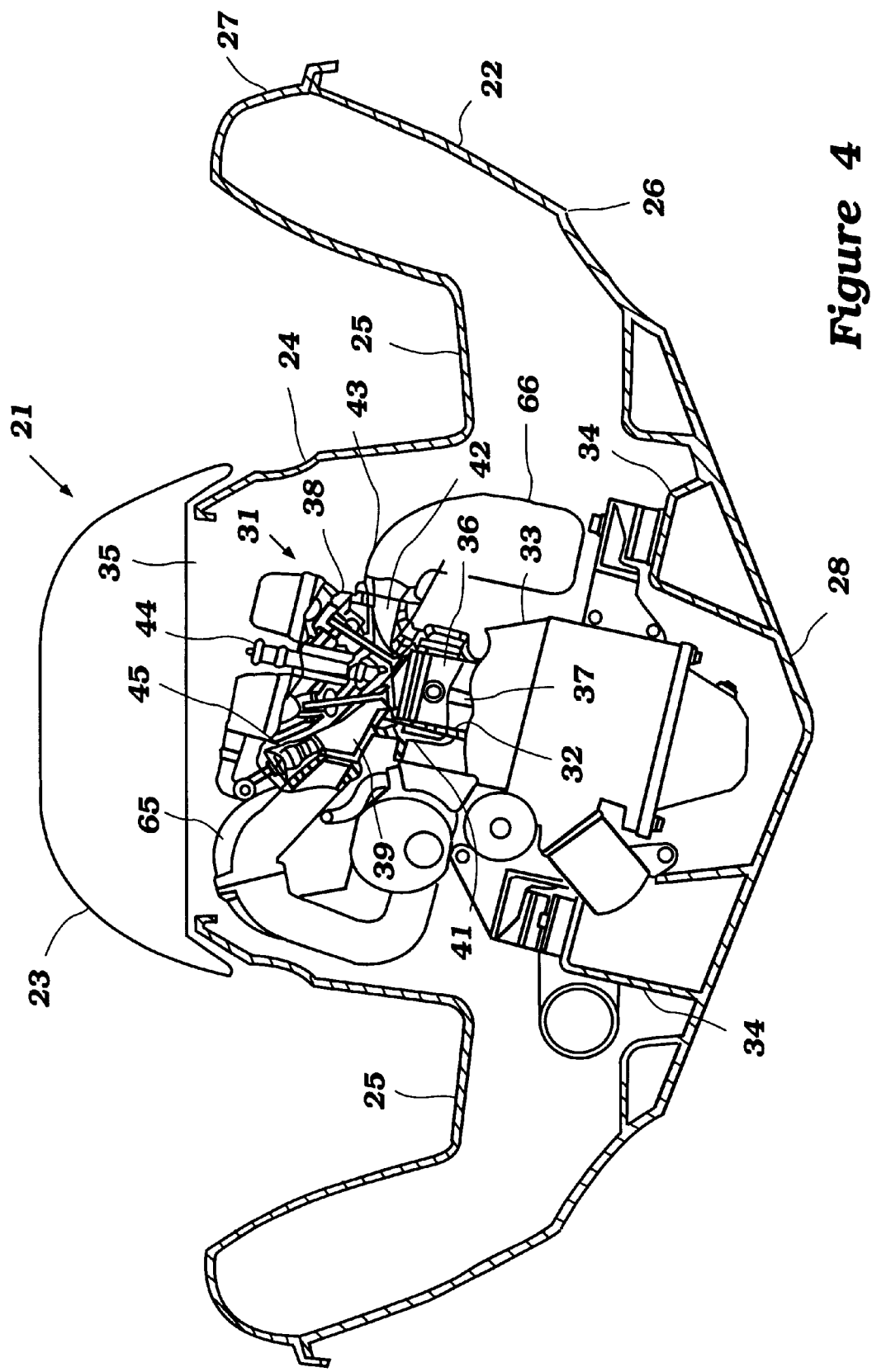
FIG. 4 is a transverse cross-sectional view taken through the watercraft and looking toward the front.

The hull 22 forms an engine compartment that is located primarily below the seat 23 and in which an internal combustion engine, indicated generally by the reference numeral 31, is provided for supplying a propulsive force to the watercraft 21. Although the engine 31 may be of any known type, in this embodiment this engine is comprised of a four cycle, four cylinder, inline engine that is disposed so that its cylinder bores, indicated at 32 in FIG. 4, are inclined slightly to one side of the vertical.

For this purpose, the cylinder block 33 of the engine 31 is mounted on a pair of pedestals 34 formed in the hull portion 26 and which have different heights. By canting the engine 31 to one side, the overall height of the package can be reduced and also the accessibility of the engine 31 for servicing can be facilitated.

It should be noted that the upper area of the hull raised portion 24 is provided with an access opening 35 which is closed by the seat 23 or by a removable portion of it so that the engine components can be accessed for service.

Pistons 36 reciprocate in the cylinder bores 32 and are connected by piston pins to the upper ends of connecting rods 37. These connecting rods 37 are journaled on the throws of a crankshaft, which does not appear in the drawings but which rotates about a longitudinally extending axis.

Still referring primarily to FIG. 4, a cylinder head assembly 38 is affixed to the cylinder block 33 in closing relationship to the cylinder bores 32. The cylinder head 38 is provided with intake passages 39 through which a intake charge is delivered to the combustion chambers of the engine through an induction system, which will be described. These intake passages are valved by intake valves 41 that are operated by an overhead cam shaft mechanism of a suitable type.

In a like manner, exhaust passages 42 extend through the opposite side of the cylinder head assembly 38 and are communicated with the combustion chambers of the engine upon the opening of exhaust valves 43 which are also operated by this overhead cam mechanism. The induction and exhaust systems which cooperate with the intake passages 39 and exhaust passages 42 will be described later.

Spark plugs 44 are mounted in the cylinder head beneath the access opening 35 so as to afford easy access and also so as to fire the charge in the combustion chambers.

This charge is formed in part by fuel injectors 45 which, in this specific embodiment illustrated inject into the intake passages 39.

It has been noted that the engine 31 is mounted in the hull so that its crankshaft rotates about a longitudinally extending axis. This is done so as to facilitate a driving connection to a transmission mechanism, indicated generally by the reference numeral 46 which couples the engine crankshaft to an impeller shaft 47 of a jet propulsion unit, indicated generally by the reference numeral 48. This jet propulsion unit is mounted at the rear portion of the hull underside in part in a tunnel area 49 formed to the rear thereof.

An impeller 51 is fixed to the impeller shaft and draws water through a downwardly facing water inlet opening 52 of the jet propulsion unit 48. This water is then discharged rearwardly through a discharge nozzle 53 so as to provide a propulsive force for the watercraft 21, in a manner well known in this art.

As is typical with this type of watercraft, the discharge nozzle 53 may be supported for steering motion about a vertically extending steering axis under the control of the watercraft control 29. In addition, this discharge nozzle may also be pivotal about a horizontally extending axis to provide trim adjustment for the watercraft.

It has been mentioned that the engine 31 is supplied with fuel by a fuel injection system which includes the fuel injectors 45. Fuel is supplied to the fuel injectors 45 from a fuel tank 54 which is mounted forwardly of the engine 31 in a spaced relationship thereto, for a reason which will become apparent. This fuel tank 54 is provided with a fill pipe 55 that extends forwardly to an area of the deck portion 27 where it can be easily accessed for filling.

A ventilation system is provided for ventilating the engine compartment and also for delivering air to the induction system of the engine. This is also done in a way to assist exhaust system cooling, as will become apparent. This ventilating system includes a vent inlet pipe 56 that is disposed forwardly in the hull and which has an upper end that is exposed to the atmosphere and a lower end which discharges in an area immediately to the front of the fuel tank 54.

This air can then flow rearwardly through the engine compartment across the components which will be described for discharge through a vent discharge pipe 57 which extends upwardly to the rear of the engine 31 and discharges to the atmosphere through the area beneath the seat 23.

It has been noted that the seat 23 is in whole or in part removable to open the access opening 35 to afford service access to the engine 31. In addition, a storage compartment containing a battery 58 may be provided under the rearward portion of the seat for storing various articles and which may also be accessible through the removal of the seat or a further portion of it.

It has been noted that there is an induction system provided for supplying an air charge to the intake passages 39 of the cylinder head. This induction system will now be described and it appears in most detail in FIGS. 1, 4 and 6 although components of it also appear in other figures.

This induction system includes an air inlet device, indicated generally by the reference numeral 59 which extends transversely across the rear portion of the engine 31 and has a sidewardly facing inlet duct 61 across which a filter element may be positioned. A resonating chamber 62 may be formed above this inlet duct 61 and communicated with it through an opening 63 so as to provide a resonator effect so as to improve the air induction efficiency.

At the end of the inlet device 59 opposite to the inlet duct 61, there is provided a throttle body 64 which extends generally in a longitudinal direction along one side of the engine 31. This throttle body 64 communicates with an intake manifold arrangement 65 that is disposed on this side of the engine and which is also accessible through the hull opening 35 upon removal of the seat portion 23.

This intake manifold thus is in a fairly compact location and also is disposed so that the inlet duct 61 will receive air that has been admitted through the engine compartment through the ventilating system already described. This air flow is also used for an exhaust cooling purpose, as will become apparent shortly.

An exhaust manifold, indicated generally by the reference numeral 66 is affixed to the cylinder head assembly 38 on the side opposite that of the intake manifold 65. This exhaust manifold 66 is provided with a plurality of runner sections, each of which cooperate with a respective one of the cylinder head exhaust passages 42. The exhaust gases are then routed forwardly toward an acoustical exhaust silencer device, indicated generally by the reference numeral 67 and which will be described in more detail short by reference to FIG. 5.

The exhaust manifold 66 communicates with the silencer device 67 through a conduit section in which a catalyst bed 68 is provided. The catalyst bed 68 is, therefore, positioned in a location where it will receive heated exhaust gases so as to operate at the appropriate temperature. The engine control may include a feedback type control system that includes an oxygen ($O_2$) sensor 69 that is disposed upstream of the catalyst bed 68. In addition, a temperature sensor 71 is disposed downstream of the catalyst bed to monitor the catalyst and exhaust temperature and to ensure that the temperature does not become to be highly elevated. Any suitable control strategy may be employed for achieving these purposes.

The silencing device 67 is mounted on the front of the cylinder block 33 by means of a pair of transversely spaced apart mounting brackets 72. This leaves an open space forwardly of the engine 31 and to the rearward portion of the fuel tank 54. Air drawn into the inlet device 59 will pass through this area to achieve exhaust component cooling.

The engine 31 may be provided with a dry sump lubrication system and a dry sump oil tank 73 can be conveniently positioned between the engine 31 and the exhaust silencing device 67. This will also be cooled by the aforenoted air flow.

Figure 5:
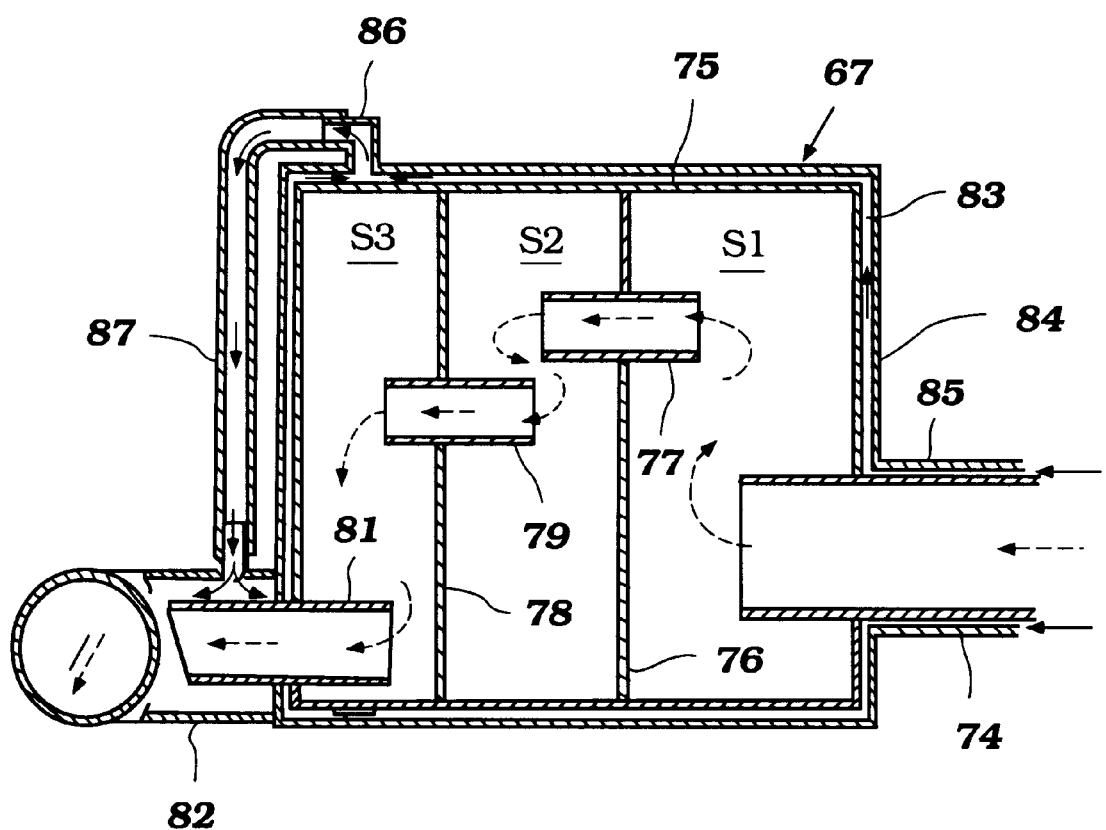
FIG. 5 is an enlarged cross-sectional view of the silencing device of this embodiment.
Figure 6:
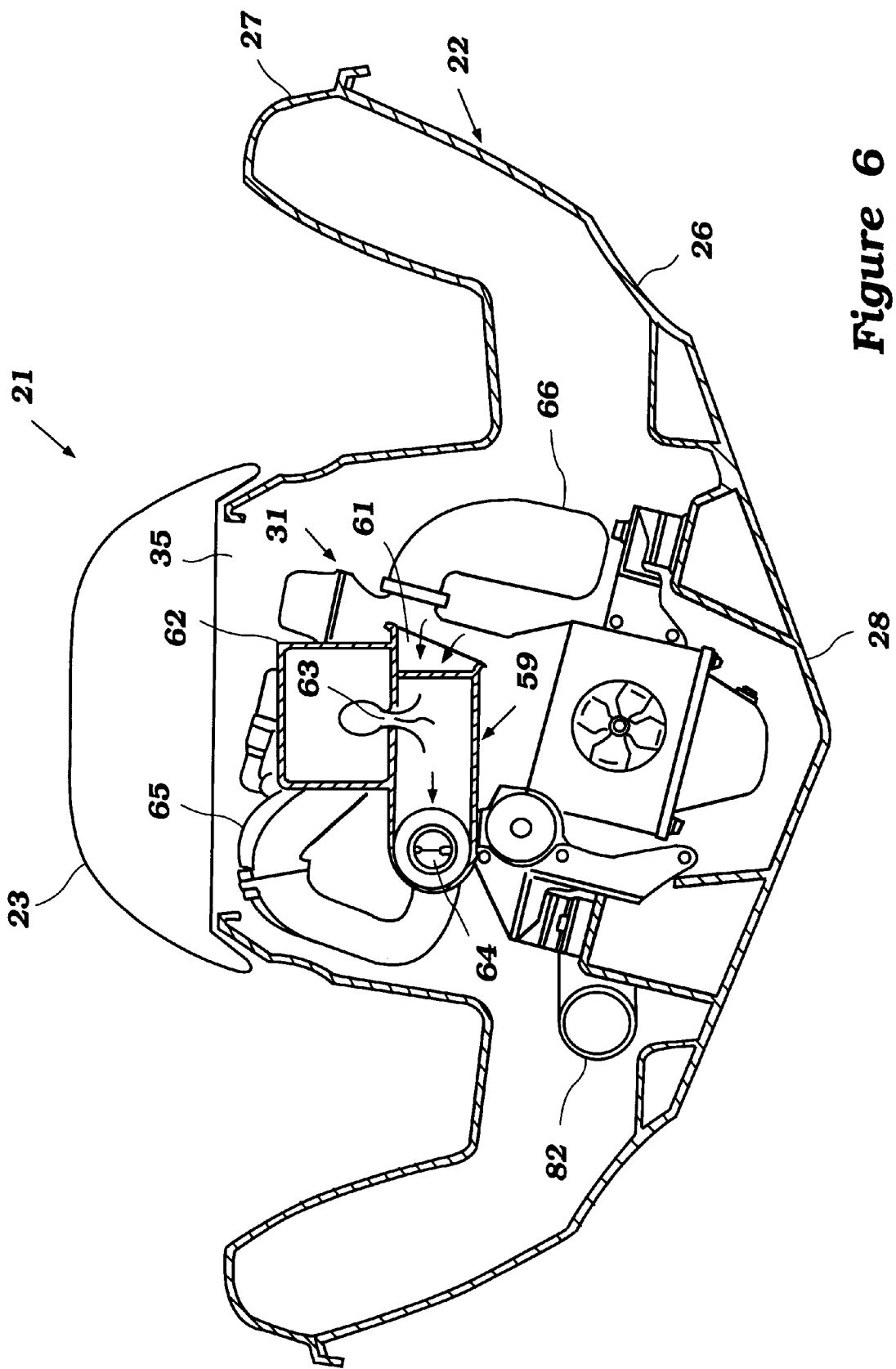
FIG. 6 is a cross-sectional taken along a plane parallel to the plane of FIG. 4 and looking in the same direction but to the rear thereof so as to show the interrelationship of additional components.

Referring now specifically to FIG. 5, the exhaust silencing device 67 is provided with an inlet conduit 74 that communicates with the discharge side of the exhaust manifold 66 downstream of the catalyst bed 68. This pipe 74 has a generally L shape. The pipe 74 communicates with a first expansion chamber S1 formed by a shell 75 of the silencer device 67 and a vertically extending baffle 76 formed therein.

A tuning tube 77 communicates the chamber S1 with a further chamber S2 that is defined by the wall 76 and an additional wall 78. The length of the tube 77 may be chosen to assist in the silencing effect. Also, the tube 77 has a smaller diameter than the exhaust pipe 74 and coupled with the volumes S1 and S2, induces an expansion and contraction and further expansion of the exhaust gases as they pass through the silencer 67. This aids in the exhaust silencing.

The wall 78 defines a further chamber S3 which communicates with the chamber S2 through another tuning tube 79. This also has a smaller diameter and thus provides a further expansion and contraction effect for assisting in the silencing of the exhaust gases.

Finally, the chamber S3 discharges the exhaust gases through a discharge pipe 81 formed in a lower portion thereof. This pipe 81 cooperates with an exhaust pipe 82 that extends first transversely and then rearwardly along the side of the engine opposite to the exhaust manifold 66 and rearwardly within the hull 22.

In order to further silence the exhaust gases and also to provide cooling and avoid elevated heat in the engine compartment, a water jacket 83 is formed around the shell 75 by an outer shell 84. This outer shell 84 has a tubular portion 85 that encircles the pipe 74 and which receives water, as shown by the solid lines in FIG. 5 either directly from the body of water in which the watercraft is operating or through discharge from a portion of the cooling jacket of the engine 31.

The engine 31 is water cooled and water for its cooling and for the exhaust silencer cooling jacket 83 may be supplied by either a separate pump or as a takeoff from the jet propulsion unit 48.

The water jacket 83 is provided with a discharge fitting 86 at an upper area thereof so as to ensure that the water jacket 83 will always be filled with water. This discharge fitting 86 communicates with a flexible conduit 87 which dumps water into the exhaust pipe 82 in the area around the outer periphery of the exhaust tube 81. Thus, the water will be mixed with the exhaust gases to further assist in their cooling.

As has been noted, the exhaust pipe 82 extends rearwardly along the side of the engine 33 opposite to the exhaust manifold 66. At an area to the rear of the hull and adjacent the one side of the jet propulsion unit 48, there is provided a water trap device, indicated generally by the reference numeral 88. This water trap device has a fairly large volume and is, as is known in the art, designed so as to trap water and to preclude its ability to flow to the engine through the exhaust system.

The water trap device 88 has disposed in an upper portion of it a discharge tube that is connected to a flexible conduit 89 which extends upwardly and transversely across the rear portion of the watercraft hull 22 so as to enter the tunnel area 49 through an exhaust discharge 91. Thus, this pipe 89 acts a further trap section to ensure that the water will be discharged from the cooling system back to the body of water in which it is operating and will avoid ingestion of water into the engine through the exhaust system.

Figure 7:
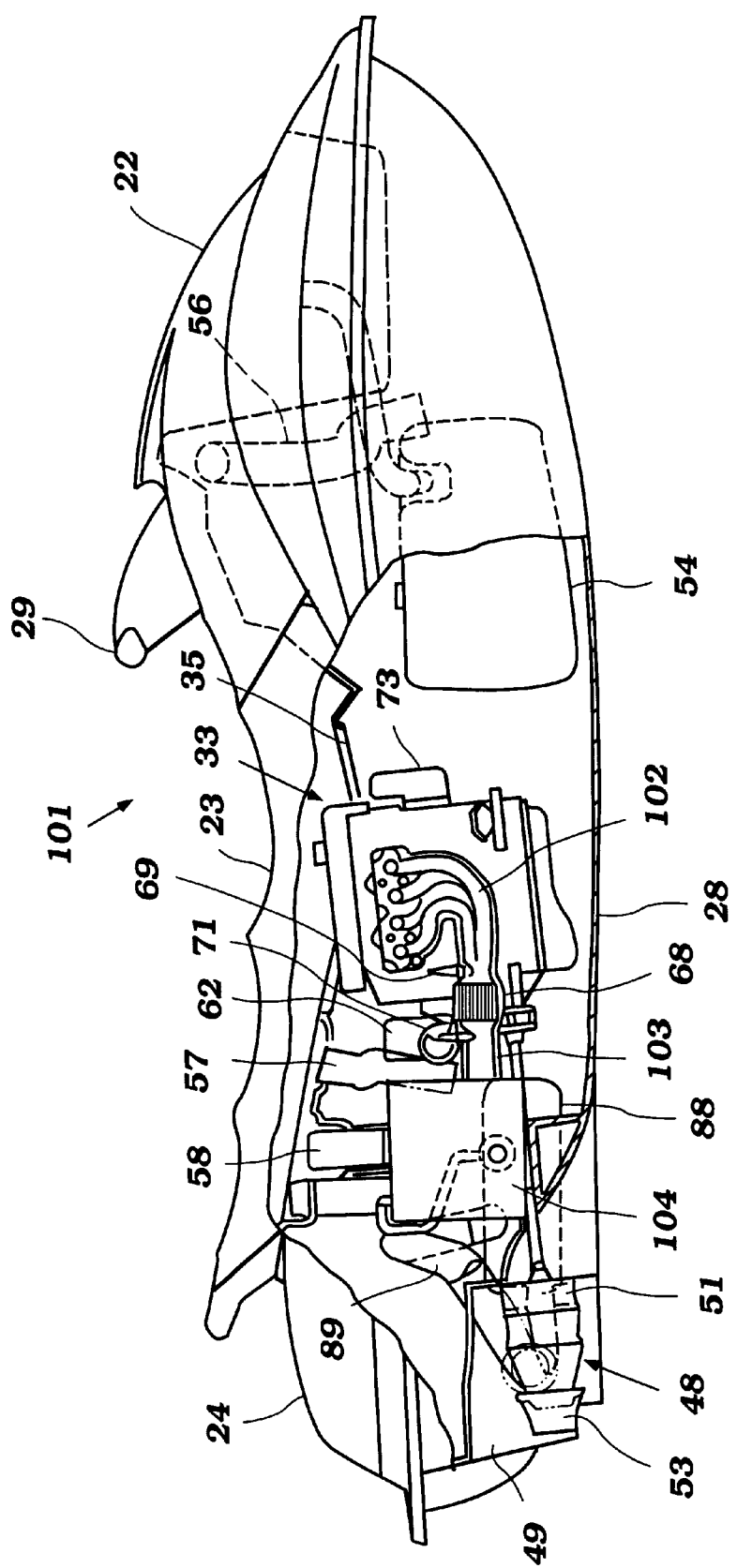
FIG. 7 is a side elevational view, in part similar to FIG. 1, and shows another embodiment of the invention, also with portions broken away.
Figure 8:
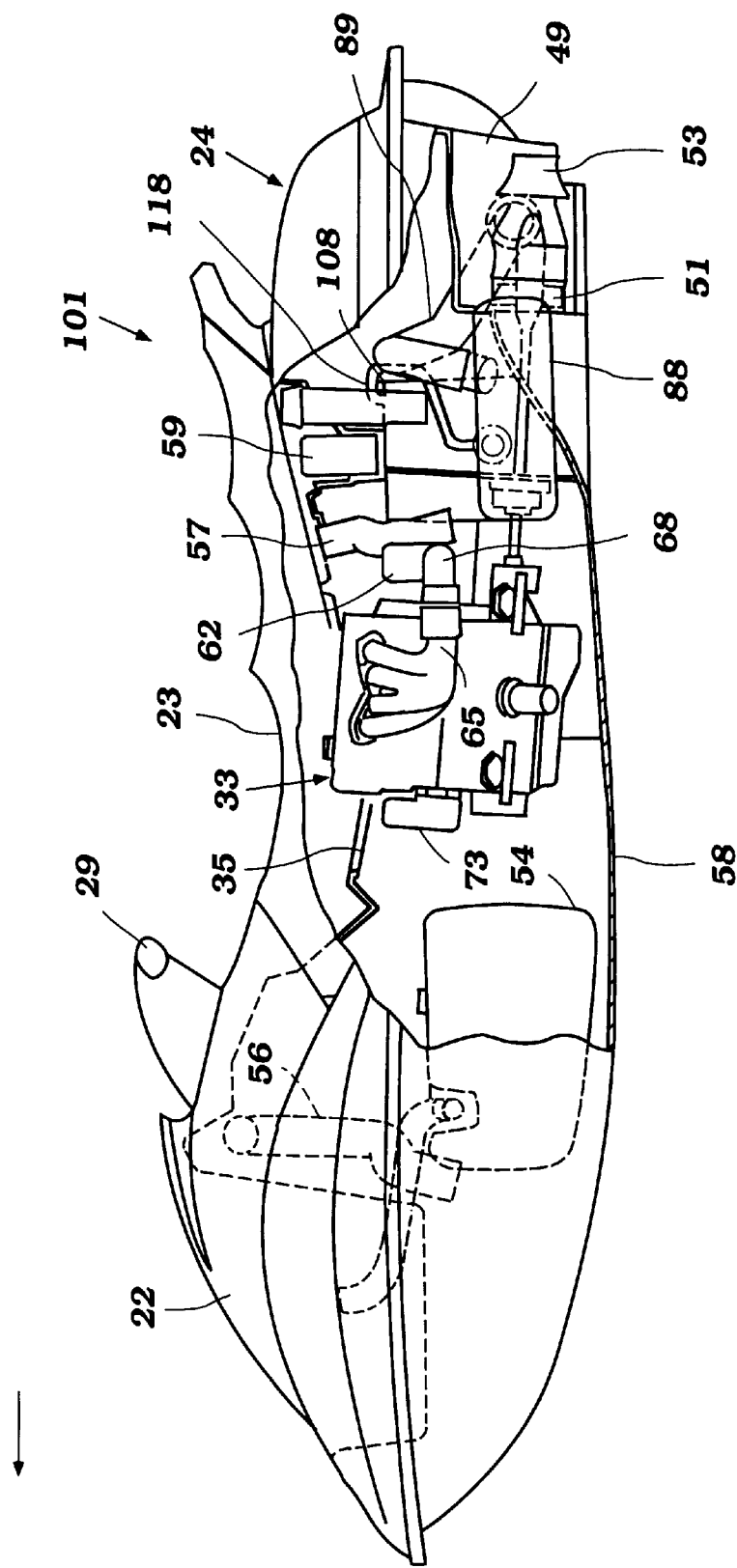
FIG. 8 is a side elevational view of the opposite side of this watercraft and thus, is similar to FIG. 2 and also has a portion of the hull broken away so as to show the internal construction.
Figure 9:
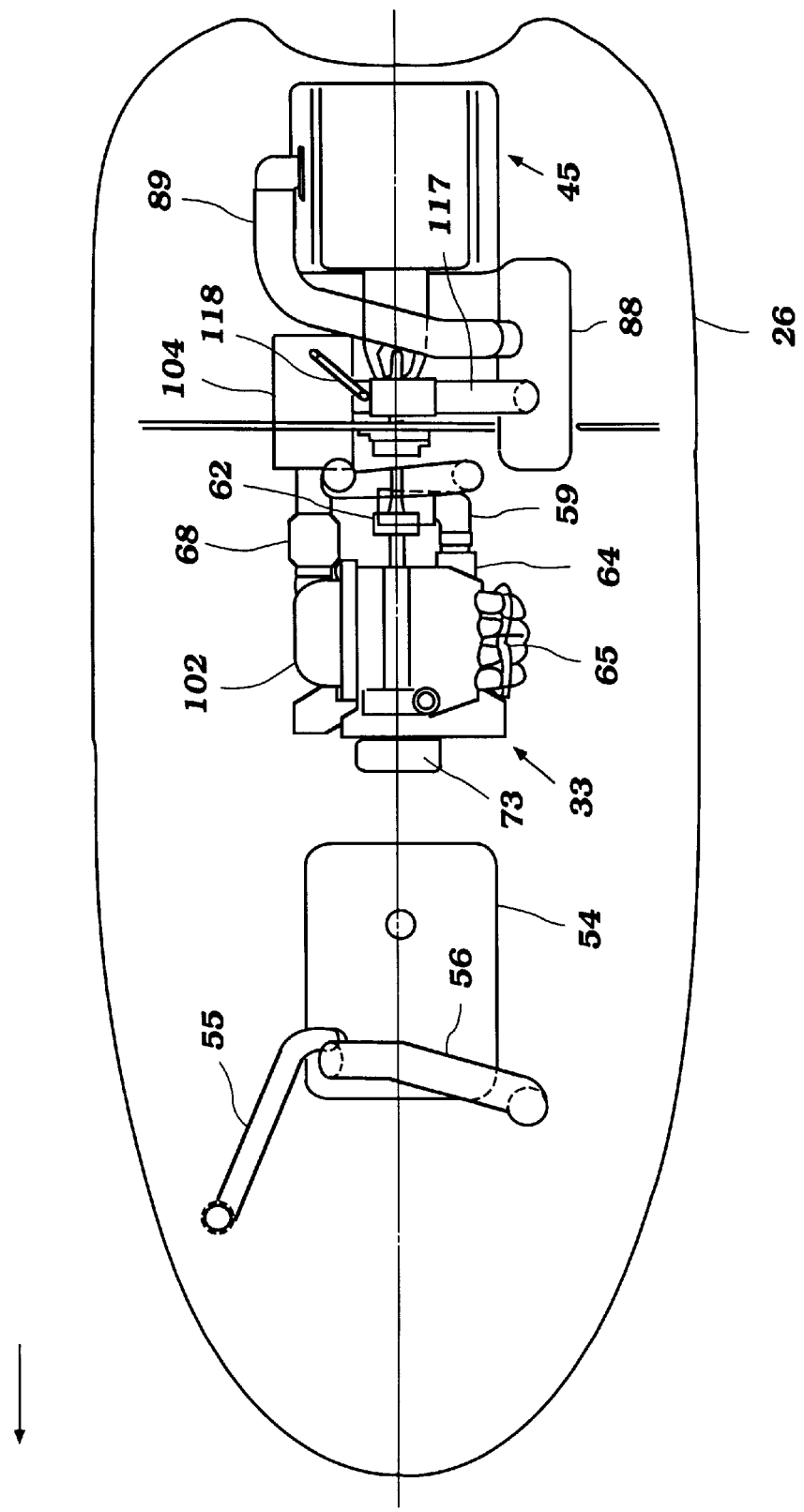
FIG. 9 is a top plan view, in part similar to FIG. 3, but for the second embodiment and showing the components in the same manner.
Figure 11:
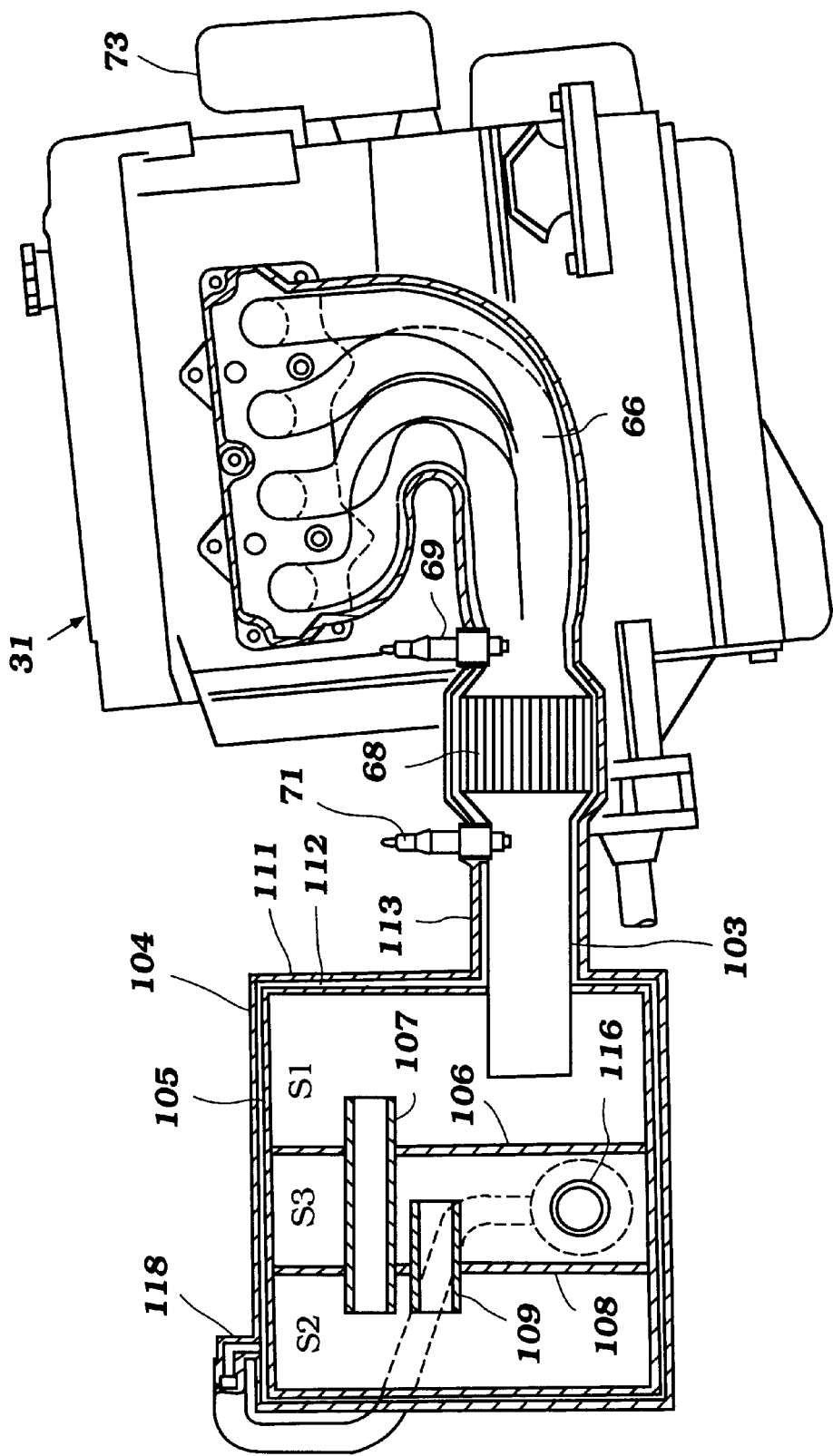
FIG. 11 is a view looking in the same general direction as FIG. 7 but is on an enlarged scale and shows the silencing device of this embodiment in cross-section.

A personal watercraft constructed in accordance with another embodiment of the invention is shown in FIGS. 7 and 11 and is indicated generally by the reference numeral 101. Except for the positioning of the components of the exhaust system, this embodiment is the same as the embodiment previously described. For that reason, components of this embodiment which are the same as the previously described embodiment have been identified by the same reference numerals and will be described again only insofar as is necessary to understand the construction and operation of this embodiment.

In this embodiment, the engine exhaust manifold, indicated generally by the reference numeral 102 is disposed on the same side of the engine 33. However, rather than discharging forwardly through a catalyst bed, this exhaust manifold 102 discharges rearwardly through a catalyst bed 68 with an oxygen sensor 69 upstream of the catalyst bed 68 and the temperature sensor 71 downstream of the catalyst bed but in a reverse orientation from that previously described.

Figure 10:
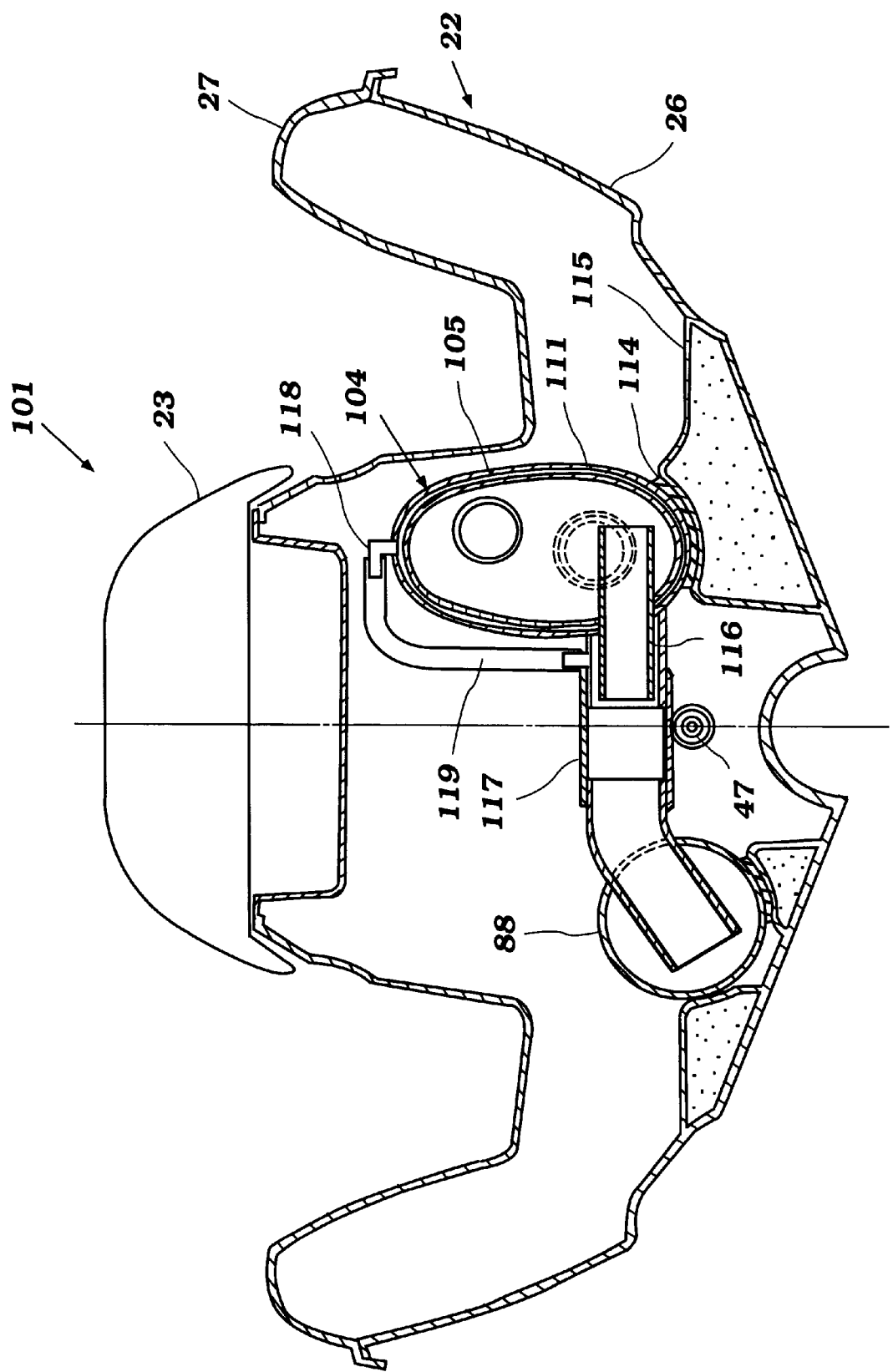
FIG. 10 is a cross-sectional view, in part similar to FIGS. 4 and 6 of the previous embodiment but taken at a different longitudinal position so as to show the relationship between the exhaust silencer and the water trap device in this embodiment.

A pipe section 103 interconnects the downstream side of the catalyst bed 68 with an acoustical exhaust silencer, indicated generally by the reference numeral 104 and which has a construction as best shown in FIGS. 10 and 11. In this embodiment, the exhaust silencer 104 has a construction of the type previously described but is oriented so as to extend longitudinally rather than transversely. Also, the silencing flow is slightly different in this embodiment as will become apparent shortly.

The pipe 103 enters a first chamber S1 formed by an outer shell 105 and an internal baffle 106. A tuning tube 107 communicates the chamber S1 with a rearward chamber S2 that is defined by a rearward wall 108 that is spaced from the wall 106 and which defines a final chamber S3 between the chambers S1 and S2. The exhaust gases flow back from the chamber S2 to the chamber S3 through a short tuning tube 109. Thus, the exhaust gases undergo several expansions and contractions as they flow through the silencing device 104 as with the previously described embodiment.

In this embodiment, the silencer 104 also has an outer shell 111 that defines a cooling jacket portion 112 around the silencer outer shell 105. Cooling water is delivered to this jacket 112 through a cooling jacket portion 113 that encircles both the exhaust manifold 66, the catalyst bed 68 and the exhaust pipe 103.

As may be best seen in FIG. 10, the silencer 104 is mounted by an elastic mount 114 on a pedestal 115 formed by the hull portion 26. A discharge pipe 116 extends transversely outwardly of the expansion chamber S3 and communicates with the water trap device 88 through a connecting pipe 117. This connecting pipe 117 extends transversely over the forward end of the impeller shaft 47.

Water from the silencer cooling jacket 112 is discharged through an upwardly positioned discharge nipple 118 into the pipe section 117 through a flexible conduit 119 to achieve the effects aforenoted. The watercraft device 88 discharges back into the tunnel through a construction the same as that previously described and which is, therefore, identified by the same reference numerals. As with the first embodiment the air flow into the induction system inlet device effects cooling of components of the exhaust system.

Figure 12:
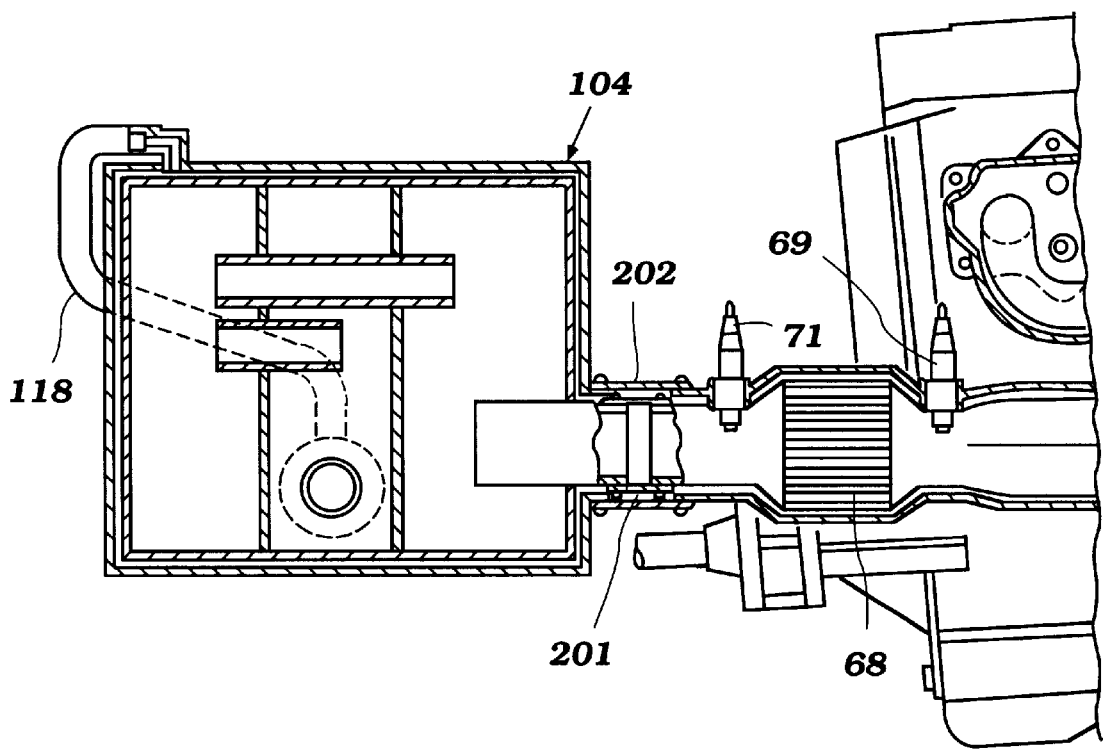
FIG. 12 is a cross-sectional view, in part similar to FIG. 11, but shows another embodiment of the invention.

FIG. 12 shows another embodiment which is basically the same as the embodiment of FIGS. 7–11. However, in this embodiment, the pipe section 117 is provided with a flexible portion 201 so as to permit them movement between the engine and the silencing device 104. Thus, the outer pipe which forms the cooling jacket 113 around the flexible section 201 is provided with its own flexible section 202.

Thus, from the foregoing description, it should be readily apparent that the described embodiments of the invention provide a very effective and compact exhaust system for a personal watercraft which will provide a high degree of silencing, permit the use of a catalyst, and nevertheless be well cooled. Also, this system cooperates with the induction system so as to ensure that air will flow effectively across the exhaust system to be coupled with the cooling water flowing around its cooling jacket to ensure minimum heat transfer within the engine compartment and also to provide further assistance in the silencing.

Of course, it should be apparent to those skilled in the art that the foregoing description is that of the preferred embodiments of the invention and that various changes and modifications can be made without departing from the spirit and scope of the invention, as defined by the appended claims.

What is claimed is:

1. A personal watercraft having a hull that defines a rider's area sized to accommodate a rider operator and no more than a few additional passengers, said hull defining an engine compartment in which a powering internal combustion engine is provided, said engine driving a propulsion device for propelling said personal watercraft through a transmission, said engine including at least one exhaust port for discharging exhaust gases from a combustion chamber of the engine to the atmosphere through an exhaust system, said exhaust system incorporating at least one acoustical silencing device spaced longitudinally of said hull from said engine for silencing the exhaust gases from said combustion chamber, and a water lock device disposed downstream of said acoustical silencing device, said acoustical silencing device being comprised of an outer shell defining an internal volume, an internal wall dividing said internal volume into two expansion chambers separated only by said internal wall and a tuning tube extending through said internal wall and extending into at least one of said expansion chambers at a position spaced from said internal wall, said acoustical silencing device and said water lock device lying on opposite sides of a plane that extends in a transverse direction of said personal watercraft so as to provide balance to the hull, and a cooling jacket surrounding said outer shell of said exhaust silencer and through which cooling water is circulated, the cooling water being discharged to a body of water in which said personal watercraft is operating through said exhaust system.

2. A personal watercraft as set forth in claim 1 wherein the cooling water is delivered to the acoustical silencing device cooling jacket at one end thereof and is discharged from said cooling jacket adjacent another end thereof.

3. A personal watercraft as set forth in claim 2 wherein the cooling water is delivered at the end where the exhaust gases enter the acoustical silencing device and the cooling water is discharged from the end where the exhaust gasses exit said acoustical silencing device.

4. A personal watercraft as set forth in claim 2 wherein the water inlet to the acoustical silencing device is in a lower area thereof and the water discharge is at an upper area thereof so as to maintain cooling water in said acoustical silencing device.

5. A personal watercraft as set forth in claim 1 wherein the acoustical silencing device is disposed to the front of the engine.

6. A personal watercraft as set forth in claim 1 wherein the acoustical silencing device extends transversely across the hull.

7. A personal watercraft as set forth in claim 6 wherein the acoustical silencing device is disposed to the front of the engine.

8. A personal watercraft as set forth in claim 7 further including a fuel tank in the hull for supplying fuel to the engine disposed to the front of said engine and the acoustical silencing device.

9. A personal watercraft as set forth in claim 1 wherein the acoustical silencing device is disposed to the rear of the engine.

10. A personal watercraft as set forth in claim 1 wherein the acoustical silencing device extends longitudinally along the hull.

11. A personal watercraft as set forth in claim 10 wherein the acoustical silencing device is disposed to the rear of the engine.

12. A personal watercraft as set forth in claim 1 further including a pair of sensors in the exhaust system for sensing different exhaust conditions, an access opening for the engine compartment through which said sensors are accessible, and a removable closure for selectively closing said access opening.

13. A personal watercraft as set forth in claim 12 wherein the pair of sensors are disposed in the exhaust system upstream of the acoustical silencing device.

14. A personal watercraft as set forth in claim 13 further including a catalyst bed in the exhaust system between the two sensors.

15. A personal watercraft as set forth in claim 14 wherein one sensor comprises an oxygen sensor and the other sensor comprises a temperature sensor.

16. A personal watercraft as set forth in claim 15 wherein the oxygen sensor is upstream of the catalyst bed.

17. A personal watercraft as set forth in claim 1 further including an air inlet system for the engine and a ventilating system for the engine compartment having an atmospheric communication and the acoustical silencing device is interrelated with said engine air inlet system and said atmospheric communication of said ventilating system so that cooling air flows across said acoustical silencing device.

18. A personal watercraft having a hull that defines a rider's area sized to accommodate a rider operator and no more than a few additional passengers, said hull defining an engine compartment in which a powering internal combustion engine is provided, said engine driving a propulsion device for propelling said personal watercraft through a transmission, said engine including at least one exhaust port for discharging exhaust gases from a combustion chamber of the engine to the atmosphere through an exhaust system, said exhaust system incorporating at least one acoustical silencing device spaced longitudinally of said hull from said engine for silencing the exhaust gases from said combustion chamber, said acoustical silencing device being comprised of an outer shell defining an internal volume, a pair of spaced internal walls dividing said internal volume into first, second and third expansion chambers separated only by said internal walls and a first tuning tube extending through only one of said internal walls and extending into at least one of the expansion chambers on opposite sides thereof and at a position spaced from said one internal wall, a second tuning tube extending through at least the other of said internal walls and into at least the remaining of said expansion chambers for providing a flow connection between said remaining expansion chamber and another of said expansion chambers, and a cooling jacket surrounding said outer shell of said exhaust silencer and through which cooling water is circulated, the cooling water being discharged to a body of water in which said personal watercraft is operating through said exhaust system.

19. A personal watercraft as set forth in claim 18 wherein the outer shell of the acoustical silencing device is closed at opposite ends thereof by end walls and further including a third tuning tube extending into an end expansion chamber defined in part by one of said end walls for conveying exhaust gasses between said end expansion chamber and the remainder of the exhaust system.

* * * * *

UNITED STATES PATENT AND TRADEMARK OFFICE
CERTIFICATE OF CORRECTION

PATENT NO.   : 6,213,827 B1
DATED        : April 10, 2001
INVENTOR(S)  : Hattori et al.

It is certified that error appears in the above-identified patent and that said Letters Patent is hereby corrected as shown below:

Column 9,
Line 14, change "gasses" to -- gases --

Column 10,
Line 48, change "gasses" to -- gases --

Signed and Sealed this

Second Day of August, 2005

JON W. DUDAS
*Director of the United States Patent and Trademark Office*